(No Model.)

J. R. BRENNAN.
SAW TABLE GAGE.

No. 271,408. Patented Jan. 30, 1883.

Attest:
F. H. Schott
A. R. Brown

Inventor
James R. Brennan
By J. C. Taskter
Atty

UNITED STATES PATENT OFFICE.

JAMES R. BRENNAN, OF ST. JOSEPH, MISSOURI, ASSIGNOR OF ONE-THIRD TO LITT R. LANCASTER AND ENOCH H. FUDGE, BOTH OF SAME PLACE.

SAW-TABLE GAGE.

SPECIFICATION forming part of Letters Patent No. 271,408, dated January 30, 1883.

Application filed April 13, 1882. (No model.)

*To all whom it may concern:*

Be it known that I, JAMES RICHARD BRENNAN, a citizen of the United States, residing at St. Joseph, in the county of Buchanan and State of Missouri, have invented a new and useful Improvement in Saw-Table Gages for Sawing Miters, &c., of which the following is a specification.

The object of my invention is to provide a cheap and simple sawing device, consisting mainly of a saw-table, gage, and grooves, all so constructed and arranged that miter-sawing may be expeditiously and accurately performed, that lumber may be sawed at any desired angle, and that all kinds of sawing, including cross-cut and rip sawing, may be done at will. I attain this object by the mechanism as illustrated in the accompanying drawings, in which—

Figure 1:
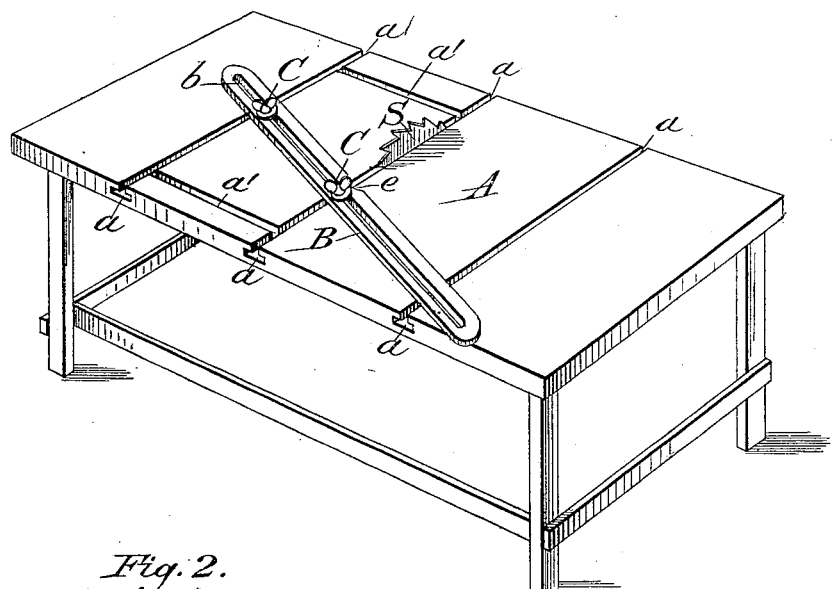
Figure 2:
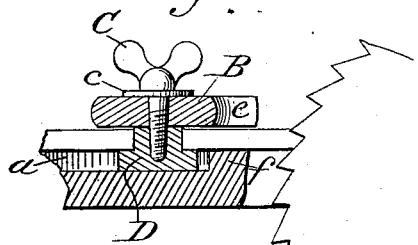
Figure 3:
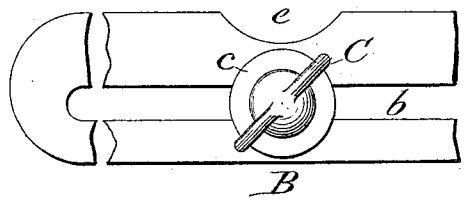
Figure 4:
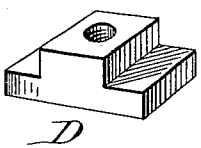

Figure 1 is a perspective view, showing the gage at an angle and the device ready for operation. Fig. 2 is a detail view, showing how the gage is held securely in proper position. Fig. 3 is a detail view of the gage, and Fig. 4 is a detail view of the T-headed nut.

Similar letters refer to similar parts throughout the several views.

A is what I call the "saw-table." It has supports as shown, or it may be supported in any appropriate way, and it is made of wood or iron or any suitable material. The table A is provided with three slots or grooves, $a$, cut across it, and two slots or grooves, $a'$, cut lengthwise of the table, and connecting the center and left grooves $a$. The grooves $a$ and $a'$ may be of any number desired, and they are made, in their lower part, of a suitable shape for the reception of the T-headed nut D, and sufficiently large, so that the nut D may move freely forward and backward, and yet be retained so as to hold the gage B in the proper angle or position for sawing.

B is what I designate a "gage." It is made of wood or iron, and of any desired length. It is narrow, long, and flat, and has extending almost its entire length the slot $b$, for the reception of the thumb-screw C. The shape and construction of gage B is clearly shown in Fig. 1 of the drawings.

C is a thumb-screw, provided with a washer or head, $c$. C rests or moves in the slot $b$ of the gage B, and screws into the T-headed nut D, and is for the purpose of holding the gage B in any desired angle or position.

D is a T-headed nut, made as shown in Fig. 4, being provided with a thread for the reception of the thumb-screw C. D slides or moves freely in the slots or grooves $a$ and $a'$, which are made of a corresponding T shape, so that D can be retained, and yet move freely.

S is a saw, which does the cutting. A circular saw is shown in the drawings; but any kind may be used, as desired.

Directly in front of the saw S, in the center groove $a$, is a stop, $f$, against which the threaded nut D strikes to prevent the gage B from striking the saw when pushed forward, the gage B being cut away at $e$ for the same purpose.

I have not deemed it essential for the purposes of my invention to show the power attached for running the saw, as it is evident that the saw may be run by either steam or foot power. I have shown the saw S in the center groove $a$. The same may, however, be placed in any one of the grooves or at the end of the table, no particular position of the saw being necessary for the objects of my invention.

The operation is as follows: The gage B is placed on the table A in the desired angle or position for cutting the miter or angle. The thumb-screws C are screwed down into the T-headed nut D, thereby holding the gage B firmly at the desired angle or position. The wood to be cut or sawed is placed on the table in front of the gage B, and the gage B is then pushed forward (the nut D sliding in the grooves $a$) until the wood in front reaches the saw and the miter or cut sawed as desired.

Having described my invention, what I claim as new, and desire to secure by Letters Patent, is—

The combination, with the table A, having slots $a$ $a'$, and saw S, journaled in one of the transverse slots $a$, of the slotted gage B, having a notch, $e$, at or near the center of that edge nearest the saw, the T-shaped nuts D, and thumb-screws C, adapted to hold the gage in place, and the stop $f$, arranged in the transverse slots, substantially as described.

In testimony whereof I affix my signature in presence of two witnesses.

JAMES RICHARD BRENNAN.

Witnesses:
 E. H. FUDGE,
 P. M. LANCASTER.